(12) United States Patent
Kubo

(10) Patent No.: US 7,456,892 B2
(45) Date of Patent: Nov. 25, 2008

(54) SIGNAL CHARGE TRANSFER LINE FOR TRANSFERRING SIGNAL CHARGE BY APPLICATION OF TRANSFER PULSES TO TRANSFER ELECTRODES

(75) Inventor: Naoki Kubo, Asaka (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 874 days.

(21) Appl. No.: 10/821,995

(22) Filed: Apr. 12, 2004

(65) Prior Publication Data

US 2004/0206885 A1    Oct. 21, 2004

(30) Foreign Application Priority Data

Apr. 15, 2003    (JP) .............................. 2003-109686

(51) Int. Cl.
*H04N 3/14*    (2006.01)
*H04N 5/235*    (2006.01)
*H04N 3/16*    (2006.01)

(52) U.S. Cl. ..................... 348/324; 348/312; 257/234

(58) Field of Classification Search ......... 348/311–317, 348/320–324; 358/482, 483; 257/234, 239
See application file for complete search history.

(56) References Cited

U.S. PATENT DOCUMENTS 5,220,185 A * 6/1993 Wada ..................... 257/239
5,528,642 A * 6/1996 Hirama ..................... 377/60

FOREIGN PATENT DOCUMENTS

JP    8-172179    7/1996

* cited by examiner

*Primary Examiner*—Ngoc-Yen Vu
*Assistant Examiner*—Carramah J Quiett
(74) *Attorney, Agent, or Firm*—McGinn IP Law Group, PLLC

(57) ABSTRACT

Disclosed is a horizontal transfer line in which first horizontal transfer pulses are applied to transfer electrodes via a commonly connected electrode line, second horizontal transfer pulses are applied to transfer electrodes via a commonly connected electrode line, and final horizontal transfer pulses are applied to a final transfer electrode via an electrode line independent of the above-mentioned electrode lines. Since the independent electrode line is independent of the other electrode lines, amount of capacitance produced in equivalent terms is reduced. The final transfer pulses exhibit a steep characteristic, thereby improving transfer efficiency. The input/output characteristic of the horizontal transfer line is improved as a result.

17 Claims, 5 Drawing Sheets

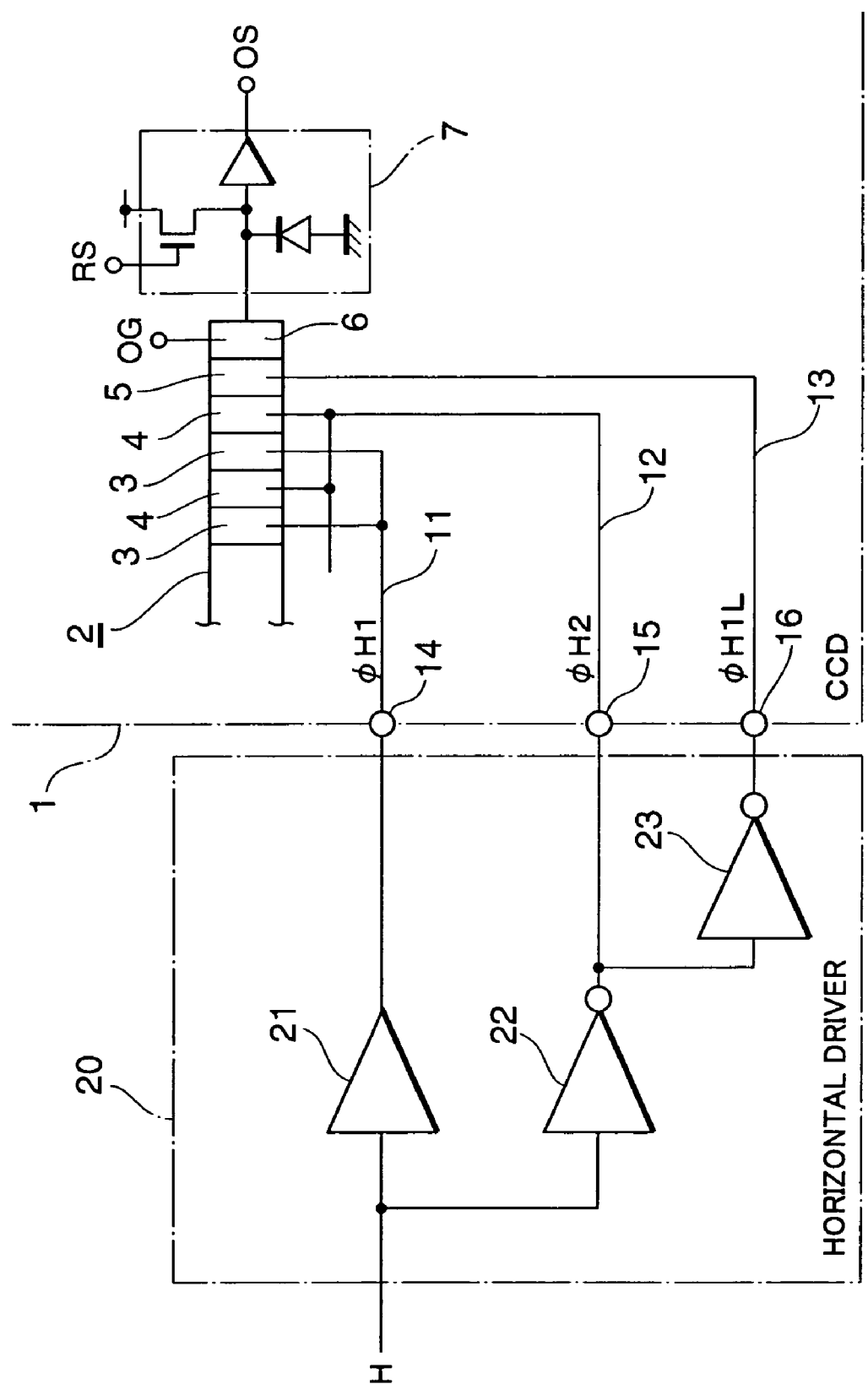

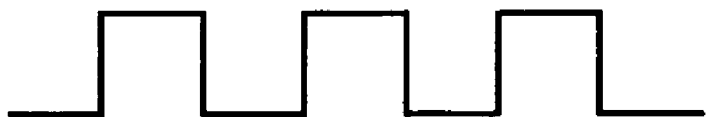
*Fig. 2A* φH1
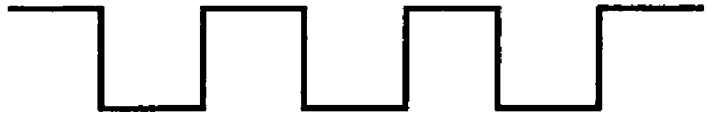
*Fig. 2B* φH2
*Fig. 2C* φH1L
*Fig. 3*
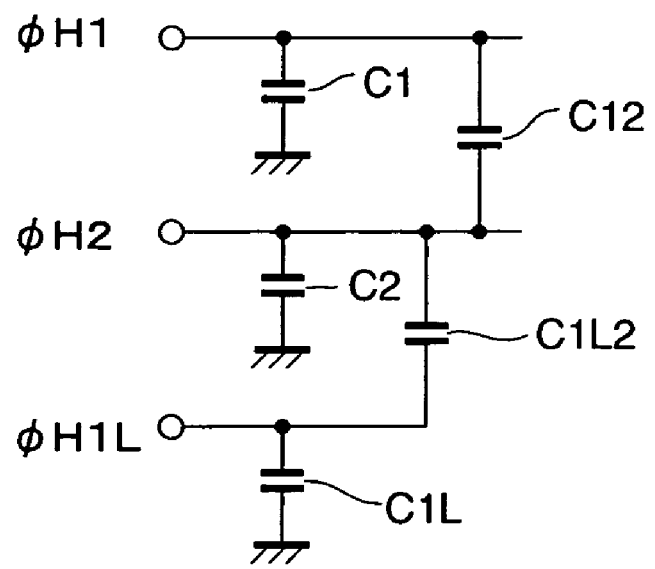

*Fig. 4A* φH1 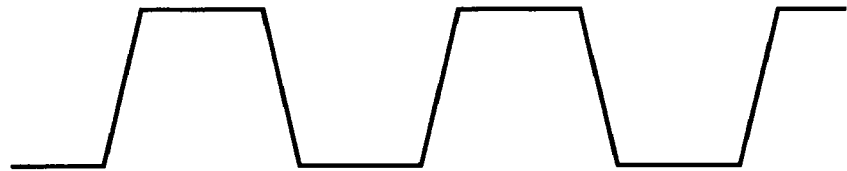
*Fig. 4B* φH1L 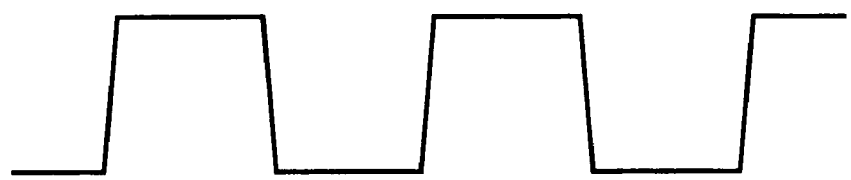

*Fig. 8A* H11 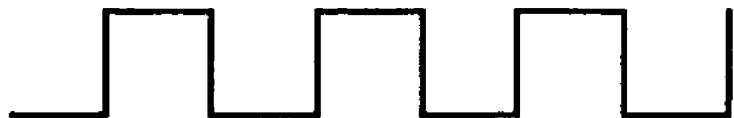
*Fig. 8B* H12 

SIGNAL CHARGE TRANSFER LINE FOR TRANSFERRING SIGNAL CHARGE BY APPLICATION OF TRANSFER PULSES TO TRANSFER ELECTRODES

BACKGROUND OF THE INVENTION

1. Field of the Invention

This invention relates to a signal charge transfer line, which has been formed on a substrate and is formed to have a number of transfer electrodes, for transferring signal charge by application of transfer pulses to the transfer electrodes via electrode lines.

2. Description of the Related Art

An output gate is formed at the output end of a transfer line that transfers signal charge in response to application of transfer pulses. Output of the signal charge that has been transferred is controlled by application of an output gate pulse to the output gate.

If the amount of signal charge transferred is small, as is the case where signal charge obtained when the image of a low-luminance subject is sensed, the next signal charge may be transferred before sweep-out of the previous signal charge from the output gate is completed. If the amount of signal charge transferred is small, the input/output characteristic may not exhibit linearity.

There is prior art (e.g., see the specification of Japanese Patent Application Laid-Open No. 8-172179) in which the width of the output gate is reduced in order that the linearity of the input/output characteristic can be maintained even if the amount of signal charge transferred is small.

If the width of the output gate is reduced, however, there are instances where signal-charge transfer capacity declines.

SUMMARY OF THE INVENTION

Accordingly, an object of the present invention is to improve the input/output characteristic without diminishing transfer capacity.

According to the present invention, the foregoing object is attained by providing a signal charge transfer line, which has been formed on a substrate and is formed to have a number of transfer electrodes, for transferring signal charge by application of transfer pulses to the transfer electrodes via electrode lines, wherein the number of transfer electrodes are divided into transfer electrodes of a plurality of sets to each of which a common transfer pulse is applied; electrode lines for applying the common transfer pulses to the transfer electrodes of the plurality of sets are formed on the substrate in common for each of the transfer electrodes of the plurality of sets; and a final electrode line for applying a transfer pulse to a final transfer electrode at an output end is formed on the substrate independently of the electrode lines of respective ones of the plurality of sets.

In accordance with the present invention, a number of transfer electrodes are divided into transfer electrodes of a plurality of sets to each of which a common transfer pulse is applied. Electrode lines that apply the common transfer pulses to the plurality of transfer-electrode sets are formed on the substrate in common for each of the transfer electrodes of the plurality of sets. A final electrode line that applies a transfer pulse to a final transfer electrode is formed on the substrate independently of the other transfer electrodes.

If an electrode line is connected in common with a plurality of transfer electrodes, the amount of capacitance produced between the transfer electrodes and ground increases. Since the final electrode line is formed on the substrate independently of the other electrode lines (i.e., not in common with the other transfer electrodes), the amount of capacitance declines. When the amount of capacitance declines, the transfer pulse applied to the final transfer electrode becomes steeper. Even if the amount of transferred signal charge is small, the signal charge that has been transferred under the final transfer electrode can be swept out efficiently. The input/output characteristic is improved despite the small amount of signal charge.

It is possible to adopt an arrangement in which the transfer line further includes a plurality of drivers provided in correspondence with respective ones of the plurality of sets of the transfer electrodes for applying transfer pulses to the corresponding sets of transfer electrodes. In this case a transfer pulse applied by at least one driver among the plurality of drivers would be applied to the final transfer electrode via the final electrode line.

Further, it is possible to adopt an arrangement in which the transfer line further includes a synchronizing circuit for synchronizing transfer pulses applied to the transfer electrodes of the plurality of sets and the transfer pulse applied to the final transfer electrode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the electrical structure of part of a CCD and a horizontal driver according to an embodiment of the present invention;

FIGS. 2A to 2C illustrate horizontal transfer pulses applied to the CCD of FIG. 1 according to this embodiment;

FIG. 3 is a circuit diagram illustrating an equivalent circuit of a horizontal transfer line according to this embodiment;

FIGS. 4A and 4B illustrate first horizontal transfer pulses and final horizontal transfer pulses, respectively;

FIGS. 8A and 8B illustrate clock pulses input to the synchronizing circuit of FIG. 7 according to this embodiment.

DESCRIPTION OF THE PREFERRED EMBODIMENT

Figure 5:
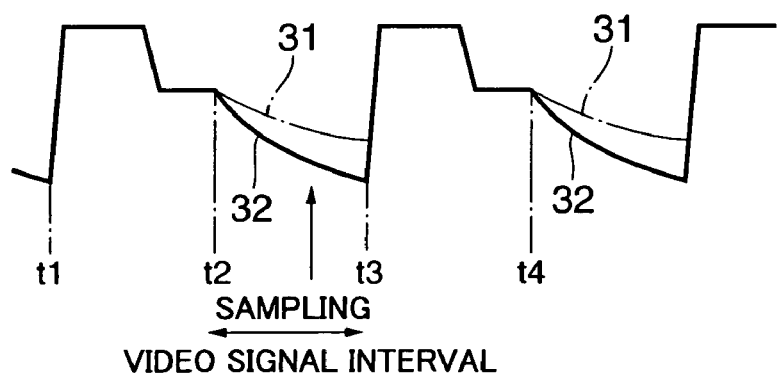
FIG. 5 illustrates a CCD output signal.

A preferred embodiment of the present invention will now be described in detail with reference to the drawings.

FIG. 1 illustrates a horizontal driver 20 and part of a CCD 1 according to an embodiment of the present invention, and FIGS. 2A, 2B and 2C illustrates first horizontal transfer pulses, second horizontal transfer pulses and final horizontal transfer pulses applied to the CCD 1 of FIG. 1.

The CCD 1 has a horizontal transfer line 2 formed on a substrate. The horizontal transfer line 2 transfers, in the horizontal direction, signal charge that has been accumulated in photodiodes (not shown) of the CCD 1 and applied via a vertical transfer line (not shown).

The horizontal transfer line 2 is formed to have horizontal transfer electrodes 3, 4 and 5. Neighboring ones of the horizontal transfer electrodes 3, 4 and 5 partially overlap each other. A number of the horizontal transfer electrodes 3 and a number of the horizontal transfer electrodes 4 are formed and alternate along the transfer line. The horizontal transfer electrode 5 is a transfer electrode (final horizontal transfer electrode) formed last on the output side. First horizontal transfer pulses φH1 are applied to all of the horizontal transfer electrodes 3 via a first electrode line 11 (see FIG. 2A), and second horizontal transfer pulses φH2, which are obtained by inverting the first horizontal transfer pulses φH1, are applied to all of the horizontal transfer electrodes 4 via a second electrode line 12 (see FIG. 2B). Final horizontal transfer pulses φH1L are applied to the final horizontal transfer electrode 5 via a third electrode line 13 (see FIG. 2C). The final transfer pulses φH1L correspond to the first horizontal transfer pulses φH1.

A first input terminal 14, second input terminal 15 and third input terminal 16 are formed on the CCD 1. The first electrode line 11 is connected to the first input terminal 14. By applying the first horizontal transfer pulses φH1 to the first input terminal 14, the first horizontal transfer pulses φH1 are applied commonly to all of the horizontal transfer electrodes 3 via the first electrode line 11. Further, the second electrode line 12 is connected to the second input terminal 15. By applying the second horizontal transfer pulses φH2 to the second input terminal 15, the second horizontal transfer pulses φH2 are applied commonly to all of the horizontal transfer electrodes 4 via the second electrode line 12. Furthermore, the third electrode line 13 is connected to the third input terminal 16. By applying the final horizontal transfer pulses φH1L to the third input terminal 16, the final horizontal transfer pulses φH1L are applied to the final horizontal transfer electrode 5. The third electrode line 13 applies transfer pulses only to the one transfer electrode 5 and does not apply the transfer pulses to a plurality of transfer electrodes. The third electrode line 13 is independent of the first electrode line 11 and second electrode line 12.

An output gate 6 is formed on the output side (the right side) of the final horizontal transfer electrode 5. By applying an output gate pulse to the output gate 6, signal charge that has been transferred through the interior of the horizontal transfer line 2 is output from the horizontal transfer line 2.

A floating diffusion amplifier 7 is formed on the output side of the horizontal transfer line 2. Signal charge that has been output from the horizontal transfer line 2 is output from the CCD 1 as a video signal via the floating diffusion amplifier 7.

The horizontal driver 20 includes a non-inverting buffer circuit 21, a first inverting buffer circuit 22 and a second inverting buffer circuit 23.

Clock pulses H are applied to the horizontal driver 20 from a timing generator (not shown) and are applied to the non-inverting buffer circuit 21 and first inverting buffer circuit 22. The output of the non-inverting buffer circuit 21 is the signal of the first horizontal transfer pulses φH1 and is applied to the first input terminal 14 of the CCD 1. Pulses obtained by inverting the entered clock pulses H are output from the first inverting buffer circuit 22. The pulses output from the first inverting buffer circuit 22 are the second horizontal transfer pulses φH2 and are applied to the second input terminal 15 of the CCD 1. The pulses output from the first inverting buffer circuit 22 are also applied to the second inverting buffer circuit 23. The pulses output from the second inverting buffer circuit 23 become pulses corresponding to the pulses that are output from the non-inverting buffer circuit 21. The pulse outputs from the second inverting buffer circuit 23 are applied to the third input terminal 16 of the CCD 1.

FIG. 3 is a circuit diagram illustrating an equivalent circuit of the horizontal transfer circuit 2.

It may be considered that a capacitance C1 is produced between the horizontal transfer electrodes 3 and ground. Further, since the horizontal transfer electrodes 3 and horizontal transfer electrodes 4 partially overlap, it may be considered that a capacitance C12 is produced between the horizontal transfer electrodes 3 and the horizontal transfer electrodes 4. Similarly, it may be considered that a capacitance C2 is produced between the horizontal transfer electrodes 4 and ground. Further, since the horizontal transfer electrode 4 and the final horizontal transfer electrode 5 partially overlap, it may be considered that a capacitance C1L2 is produced between horizontal transfer electrode 4 and the final horizontal transfer electrode 5. Furthermore, it may be considered that a capacitance C1L is produced between the final horizontal transfer electrode 5 and ground.

The final horizontal transfer electrode 5 is provided with a horizontal transfer pulse independently, unlike the case with the horizontal transfer electrodes 3 or horizontal transfer electrodes 4, as mentioned above. The amount of capacitance C1L produced between the final horizontal transfer electrode 5 and ground is small in comparison with the amounts of the other capacitances.

FIGS. 4A and 4B illustrate the first horizontal transfer pulses φH1 and the final horizontal transfer pulses φH1L, respectively.

As mentioned above, the amount of capacitance C1L produced between the final horizontal transfer electrode 5 and ground is small in comparison with the amount of capacitance produced between the first horizontal transfer electrodes 3 and ground. This means that the final transfer pulses φH1L have steeper rising and falling edges than those of the first horizontal transfer pulses φH1.

FIG. 5 illustrates the output signal of the CCD 1.

As shown in FIG. 5, the level of the signal from time t2 to time t3 (which shall be referred to as the "video signal interval") during which the first horizontal transfer pulse φH1 and final horizontal transfer pulse φH1L are at the L level corresponds to the level of the signal charge that has accumulated in the CCD 1. The signal in the video signal interval is sampled by a correlated double sampling circuit connected downstage of the CCD 1.

When the final horizontal transfer pulse φH1L does not exhibit a characteristic having a steep rising or falling edge, signal charge that has accumulated under the final horizontal transfer electrode 5 cannot be swept out to the output gate 6 rapidly. As a consequence, the signal in the video signal interval also falls gradually, as indicated at reference numeral 31 in FIG. 5, and a signal having a level higher than the rightful signal level happens to be sampled.

By contrast, when the final horizontal transfer pulse φH1L does exhibit a characteristic having steep rising and falling edges, signal charge that has accumulated under the final horizontal transfer electrode 5 can be swept out to the output gate 6 rapidly. As a result, the signal in the video signal interval also falls comparatively quickly, as indicated at reference numeral 32 in FIG. 5, and a signal having the rightful signal level can be sampled.

Figure 6:
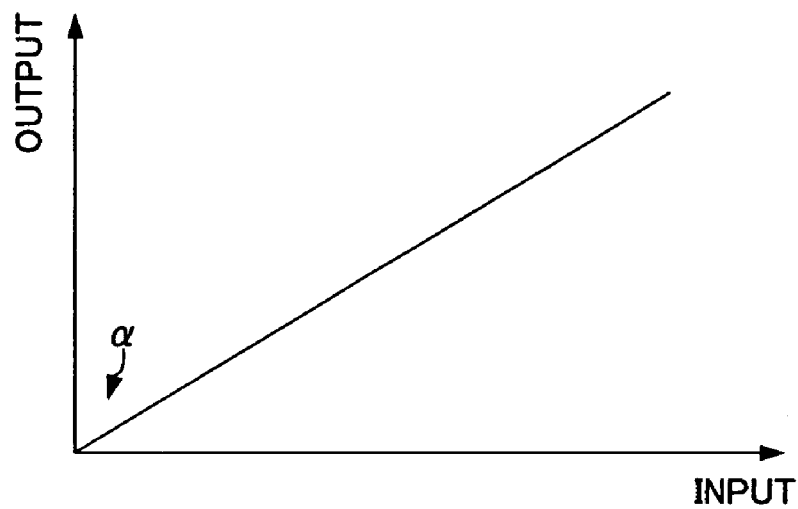
FIG. 6 is a graph illustrating an input/output characteristic of a horizontal transfer line.

FIG. 6 is a graph illustrating the CCD input/output characteristic.

The amount of signal charge that accumulates in the CCD photodiodes is small in certain cases, e.g., when an image of a subject has a low luminance. The amount of signal charge transferred through the horizontal transfer line also is small. When the amount of signal charge is small, in general the next signal charge will enter the output gate before all of the preceding signal charge is output from the output gate. A signal having a level higher than the rightful signal level is sampled, as pointed out above, and the input/output characteristic in the low-luminance portion often will not have a linear characteristic. Since the final horizontal transfer pulses φH1L have steep rising and falling edges in this embodiment, as mentioned above, signal charge can be swept out from the output gate quickly even if the amount of the signal charge is small. Accordingly, the input/output characteristic has linearity, even in the low-luminance portion, as indicated at reference character a in FIG. 6.

Figure 7:
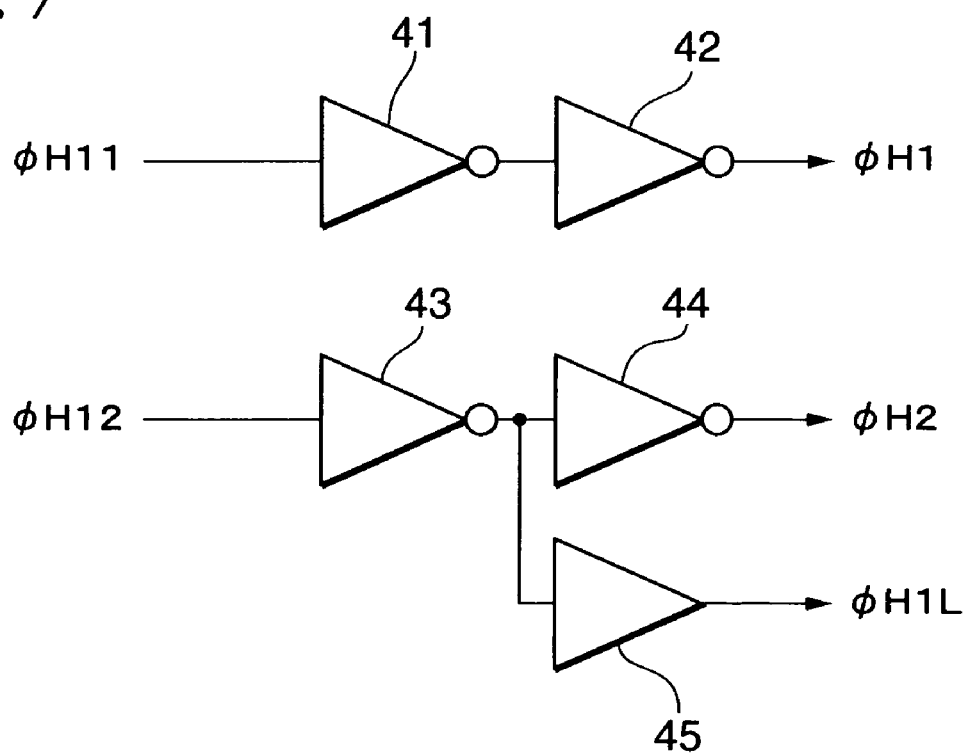
FIG. 7 illustrates the electrical structure of a synchronizing circuit according to this embodiment.

FIG. 7 illustrates the electrical structure of a circuit for synchronizing the first horizontal transfer pulses φH1, second horizontal transfer pulses φH2 and final horizontal transfer pulses φH1L. FIGS. 8A and 8B are time charts of first clock pulses φH11 corresponding to the first horizontal transfer pulses φH1 and second clock pulses φH12 corresponding to the second horizontal transfer pulses φH2, respectively.

As shown in FIGS. 8A and 8B, the first clock pulses φH11 and the second clock pulses φH12 are clock pulses that are opposite in phase to each other and the periods of the pulses φH11 and φH12 are the same as those of the first and second horizontal transfer pulses φH1, φH2.

The first clock pulses φH11 are inverted in a first inverting buffer circuit 41 and then input to a second buffer circuit 42. The pulses are inverted again in the second buffer circuit 42, whereby the first horizontal transfer pulses φH1 are generated, as indicated in FIG. 2A.

The second clock pulses φH12 are inverted in a third inverting buffer circuit 43. The second clock pulses φH12 that have been inverted in the third inverting buffer circuit 43 are input to a fourth inverting buffer circuit 44 and to a non-inverting buffer circuit 45. The pulses are inverted again in the fourth inverting buffer circuit 44, whereby the second horizontal transfer pulses φH2 are generated, as illustrated in FIG. 2B. Further, the pulses that have been input to the non-inverting buffer circuit 45 are output via the non-inverting buffer circuit 45, whereby the final horizontal transfer pulses φH1L are generated, as illustrated in FIG. 2C.

By utilizing the synchronizing circuit of FIG. 7, the first horizontal transfer pulses φH1, second horizontal transfer pulses φH2 and final horizontal transfer pulses φH1L pass through two buffer circuits and therefore all of the transfer pulses φH1, φH2, φH1L are synchronized.

Though a horizontal transfer line has been described in the above embodiment, it goes without saying that the present invention is similarly applicable also to a vertical transfer line.

As many apparently widely different embodiments of the present invention can be made without departing from the spirit and scope thereof, it is to be understood that the invention is not limited to the specific embodiments thereof except as defined in the appended claims.

What is claimed is:

1. A signal charge transfer line which has been formed on a substrate and is formed to have a number of transfer electrodes, for transferring signal charge by application of transfer pulses to the transfer electrodes via electrode lines, wherein:
the number of transfer electrodes are divided into transfer electrodes of a plurality of sets to each of which a common transfer pulse is applied;
electrode lines for applying common transfer pulses to the transfer electrodes of the plurality of sets are formed on said substrate in common for each of the transfer electrodes of the plurality of sets;
an output gate for outputting the signal charge transferred in the signal charge transfer line is formed on a final part of an output end of the signal charge transfer line;
an electrode line for applying a transfer pulse to a transfer electrode in front of said output gate is inherently formed on said substrate independently of the electrode lines of respective ones of the plurality of sets,
wherein the transfer pulses, which are outputted from two inverting buffer circuits connected in series, are applied to the transfer electrodes of the plurality of sets, and
wherein the transfer pulse, which is outputted from a non-inverting buffer circuit inputting a pulse is outputted from the first inverting buffer circuit of the two inverting buffer circuits.

2. The signal charge transfer line according to claim 1, further including a plurality of drivers provided in correspondence with respective ones of the plurality of sets of the transfer electrodes for applying transfer pulses to the corresponding sets of transfer electrodes;
wherein the transfer pulse applied by at least one driver among said plurality of drivers is applied to said final transfer electrode in front of said output gate.

3. The signal charge transfer line according to claim 1, further including a synchronizing circuit for synchronizing transfer pulses applied to the transfer electrodes of the plurality of sets and the transfer pulse applied to said transfer electrode in front of said output gate.

4. The signal charge transfer line according to claim 1, wherein the electrode line is connected only to the transfer electrode in front of said output gate.

5. The signal charge transfer line according to claim 1, wherein the separate electrode line applies the transfer pulse only to the final transfer electrode.

6. A signal charge transfer line, comprising:
a plurality of transfer electrodes, wherein a common transfer pulse is applied to each of the plurality of transfer electrodes;
a plurality of electrode lines for applying the common transfer pulse to each of the plurality of transfer electrodes;
an output gate on an output end of the signal charge transfer line, wherein a separate electrode line is connected to a final transfer electrode independently of the plurality of electrode lines,
wherein the separate electrode line applies a transfer pulse to the final transfer electrode independently from the common transfer pulse applied to each of the plurality of electrodes,
wherein the transfer pulses, which are outputted from two inverting buffer circuits connected in series, are applied to the transfer electrodes of the plurality of sets, and
wherein the transfer pulse, which is outputted from a non-inverting buffer circuit inputting a pulse is outputted from the first inverting buffer circuit of the two inverting buffer circuits.

7. The signal charge transfer line according to claim 6, wherein the final transfer electrode is located in between the plurality of transfer electrodes and the output gate.

8. The signal charge transfer line according to claim 6, wherein the separate electrode line is connected only to the final transfer electrode.

9. The signal charge transfer line according to claim 6, wherein the output gate is located on an output side of the final transfer electrode.

10. The signal charge transfer line according to claim 6, wherein the separate electrode line applies the transfer pulse only to the final transfer electrode.

11. The signal charge transfer line according to claim 6, wherein the final transfer electrode receives the transfer pulse only from the separate electrode line.

12. A signal charge transfer line, comprising:
- an electrode line means for applying a common transfer pulse to each of a plurality of transfer electrodes;
- an output gate means for outputting a signal charge transferred in the signal charge transfer line;
- a separate electrode line means for applying a transfer pulse to a final transfer electrode, wherein the separate electrode line means is independent of the electrode line means,
- wherein the separate electrode line means applies the transfer pulse to the final transfer electrode independently from the common transfer pulse applied to each of the plurality of electrodes,
- wherein the transfer pulses, which are outputted from two inverting buffer circuits connected in series, are applied to the transfer electrodes of the plurality of sets, and
- wherein the transfer pulse, which is outputted from a non-inverting buffer circuit inputting a pulse is outputted from the first inverting buffer circuit of the two inverting buffer circuits.

13. The signal charge transfer line according to claim 12, wherein the final transfer electrode is located at an output end of the signal charge transfer line in between the plurality of transfer electrodes and the output gate means.

14. The signal charge transfer line according to claim 12, wherein the separate electrode line means is connected only to the final transfer electrode.

15. The signal charge transfer line according to claim 12, wherein the separate electrode line means applies the transfer pulse only to the final transfer electrode.

16. The signal charge transfer line according to claim 12, wherein the output gate means is located at an output end of the signal charge transfer line.

17. The signal charge transfer line according to claim 12, wherein the final transfer electrode receives the transfer pulse only from the separate electrode line means.

\* \* \* \* \*